United States Patent [19]

Etherington et al.

[11] Patent Number: 4,707,573
[45] Date of Patent: Nov. 17, 1987

[54] ELECTRICAL CONDUCTOR ARRAY

[75] Inventors: Harry J. C. Etherington, Surrey; Paul C. Joslin, Berkshire, both of England; David E. Carr, Springfield, Va.; Raymond Simpson-Davis, Hants, England

[73] Assignee: The De La Rue Company, England

[21] Appl. No.: 922,320

[22] Filed: Oct. 23, 1986

[30] Foreign Application Priority Data

Oct. 23, 1985 [GB] United Kingdom ................. 8526113

[51] Int. Cl.$^4$ ............................................. G08C 21/00
[52] U.S. Cl. ....................................... 178/18; 382/13
[58] Field of Search ................. 178/18, 19, 20; 382/3, 382/13; 340/706

[56] References Cited

U.S. PATENT DOCUMENTS

| 3,894,183 | 7/1975 | Barish | 178/18 |
| 4,017,848 | 4/1977 | Tannas, Jr. | 340/365 R |
| 4,455,450 | 6/1984 | Margolin | 178/18 |
| 4,455,452 | 6/1984 | Schuyler | 178/18 |
| 4,560,830 | 12/1985 | Perl | 178/19 |
| 4,564,079 | 1/1986 | Moore et al. | 178/18 |

FOREIGN PATENT DOCUMENTS 0032013 12/1980 European Pat. Off. .
2567294 7/1984 France .

Primary Examiner—Stafford D. Schreyer
Attorney, Agent, or Firm—Ostrolenk, Faber, Gerb & Soffen

[57] ABSTRACT

An electrical conductor array particularly for use in a pressure pad is described. The pressure pad comprises two electrical conductors arrays (3,5) of substantially parallel electrical conductors which are superposed and biased towards a spaced apart position with the conductors of one array transverse to the conductors of the other. One of the arrays (5) is responsive to applied pressure on the array to deflect against the bias towards the other array (3). At least one of the arrays (3,5) comprises a number of blocks of substantially parallel first conductors (12), the first conductors of each block being electrically connected to respective first common conductors (13); and, between pairs of first conductors (12) of each block, a respective second conductor (14), corresponding second conductors (14) from each block being electrically connected to a respective second common conductor (15).

13 Claims, 7 Drawing Figures

ELECTRICAL CONDUCTOR ARRAY

FIELD OF THE INVENTION

The invention relates to electrical conductor arrays, particular for use in pressure location systems.

DESCRIPTION OF THE PRIOR ART

A typical pressure location system makes use of a pressure pad of the kind comprising two arrays of substantially parallel electrical conductors which are superposed and biased towards a spaced apart postion with the conductors of one array transverse to the conductors of the other, and wherein at least one array is responsive to applied pressure on the array to deflect against the bias towards the other array. Such pressure pads are hereinafter referred to as of the kind described.

In typical pressure pads of the kind described, the conductors of the arrays are arranged at right angles and when pressure is applied at a position on one array, this array will deflect to bring the conductor(s) at that position into contact with or adjacent to corresponding conductors of the other array. This completes certain electrical circuits of pressure location systems to provide signals corresponding to the X and Y coordinates of the position at which pressure is applied. If the pressure location system also includes a timing device enabling the contact condition of the pressure pad to be sampled at different time intervals then the movement of the position of applied pressure with time can be monitored.

Pressure pads of the kind described find particular application in signature determination and verification apparatus where a writing medium is positioned on the pressure pad and a signature is then written on the writing medium. Pressure location systems incorporating a pressure pad can then monitor movement of the writing instrument while the signature is being written to provide not only spatial information regarding the signature but also dynamic information.

There are many other applications of pressure pads including for example CAD/CAM and in character recognition systems.

One of the advantages of pressure pads of the kind described is that a conventional writing instrument may be used. However, electrical conductor arrays have also been developed for use with special writing instruments which are able to detect electromagnetic fields or potentials when brought adjacent to such an array.

In order to locate the position of a writing instrument relatively to the array, the conductors in the array must be energised in a particular manner, for example by transmitting signals along the conductors. In the past, this has required complex equipment to enable each conductor in the array to receive an individual signal typically in the form of a voltage pulse.

SUMMARY OF THE INVENTION

In accordance with the present invention, an electrical conductor array comprises a number of blocks of substantially parallel first conductors, the first conductors of each block being electrically connected to respective first common conductors; and, between pairs of first conductors of each block, a respective second conductor, corresponding second conductors from each block being electrically connected to a respective second common conductor.

This invention simplifies known electrical conductor arrays by enabling a significant reduction in the complexity of the control equipment to be achieved. Thus, by linking a number of the conductors in the arrays together and connecting each set to a respective common conductor, a small resultant number of common conductors is achieved. For example, a conventional array having 352 electrical conductors could be divided into eleven blocks each having 16 first or coarse conductors and 16 second or fine conductors. All the coarse conductors in a block are connected to a respective common first conductor while respective fine conductors from each block are connected to corresponding common fine conductors. This results in a total of 27 first and second common conductors which provides a significant reduction from the original 352 conductors which would need to be sequentially energised in the known systems.

Conveniently, the conductors are spaced apart by substantially equal intervals.

The invention has particular application to a pressure pad of the kind described which is characterised in that at least a first one of the arrays of conductors is constructed in accordance with the present invention, and wherein the conductors of the arrays are connected in use to processing means to enable the position of applied pressure to be determined.

These pressure pads may be incorporated in a pressure location system which further comprises processing means electrically connected to the conductors of each array, the processing means being adapted to transmit signals along the conductors of a second one of the arrays and to determine from signals received on the first common conductors of the first array the location of a block of conductors of the first array within which a position of applied pressure is located, in use, and to determine from signals received on the second common conductors of the first array the position of applied pressure within that block.

Such pressure location systems may be used with a special writing instrument electrically connected to the processing means but are particularly useful with standard writing instruments such as a ballpoint pen.

The signals generated by the processing means may be in the form of constant, different potentials which are applied to each of the common conductors. Preferably, however, substantially the same, set value potential is applied to all the conductors of one array and these potentials are pulsed in sequence, for example with a zero voltage pulse, to provide the signal. In this way, the conductors of the second array are sequentially strobed (in sets) while the processing means scans the conductors of the other array to determine on which of these conductors a signal is received. A signal will be received if the conductor which is strobed has been brought into the vicinity of or into contact with a conductor or conductors in the first array. In this way, the position of applied pressure can be determined.

These pressure location systems may be incorporated in a variety of systems such as character recognition systems. They are particularly suited for use in signature determination or signature verification apparatus which further comprises a storage system coupled with the processing means to record the series of positions of applied pressure determined by the processing means while a signature is written on the pressure pad to generate a record of the signature. If the position location system is incorporated in signature verification apparatus, the stored signature would then be compared using conventional comparison techniques with previously stored signature data.

It is important for pressure pads to be able to cope with wide variations in applied pressure. One particular problem is that with pads designed to sense light pressure, the application of a heavy pressure will cause a large and confused matrix of contacts between conductors of the arrays to occur. This requires complex computer processing to determine the centre of pressure of the matrix.

However, if the pad is modified to reduce the size of the matrix of contacts when heavy pressure is applied, for example by stiffening the array, then the pad becomes insensitive to light pressures.

Preferably, therefore, the space between the arrays is sealed and contains a substantially incompressible fluid, the arrangement being such that when pressure is applied to the one array, the fluid flows away from the position of applied pressure.

Thus, as fluid flows away from the position of applied pressure, adjacent portions of the arrays are forced apart thus reducing the size of the matrix of contact points for a given pressure.

The inclusion of a fluid between the arrays will actually increase the minimum pressure which is sensed but significantly reduce the confusion of contacts. However, the presence of the fluid allows the stiffness and spacing of the arrays to be modified so that the minimum pressure can be significantly reduced.

Although in many cases it is necessary for there to be actual contact between conductors to obtain flow of electric current between the conductors, in some examples contact may not be necessary, the pad operating on an inductive basis. The phrase "matrix of contact points" should therefore be read accordingly.

Typically, the arrays may be bonded to a plastics substrate such as a polyimide (for example Kapton) having a thickness in the order of 0.002 inches.

The fluid may comprise a liquid or a pressurised gas such as air at a pressure greater than one atmosphere.

Where the electrical conductors are exposed, the fluid should be substantially non-electrically conductive. Other properties of the fluid which are particularly advantageous are a low viscosity with a minimal change over the operating temperature range, good dielectric properties, low surface tension, low compressibility, high shear stability, chemically inert and non-corrosive, high oxidation stability, low flammability, and non-toxicity.

Examples of suitable liquids include hydraulic oils such as Shell Tellus T15 and silicone fluids of the polydimethylsiloxane type with viscosities in the range 5 to 20 centistokes.

In some examples where a liquid is used, the liquid may include residual air to improve sensitivity of the pressure pad.

In other examples, part of the wall defining the sealed space may be flexible with the space being substantially filled with fluid when the wall part is in a non-flexed condition. In this latter case, an additional chamber may be provided in fluid communication with the sealed space, the wall part of the additional chamber being flexible.

In a particularly preferred arrangement, the space between the arrays is filled with a low dynamic viscosity fluid (eg. silicone fluid at 5 centistokes) with the exclusion of substantially all residual air.

The arrays may be sealed together with suitable spacers, such as plastics spacers, using mechanical clamping, adhesives, ultrasonic welding or the like.

DESCRIPTION OF THE DRAWINGS

Some examples of pressure location systems having pressure pads incorporating electrical conductor arrays in accordance with the invention will now be described with reference to the accompanying drawings, in which.

DETAILED DESCRIPTION OF THE EMBODIMENTS

Figure 1:
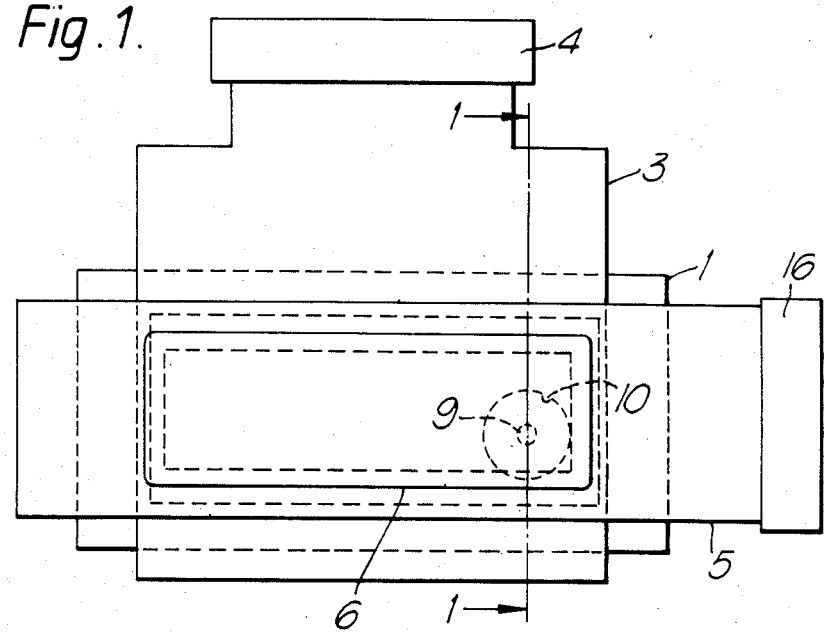
FIG. 1 is a plan view of one example of a pressure pad.
Figure 2:
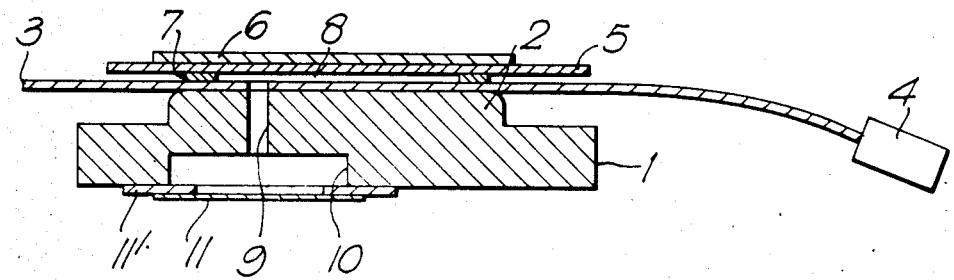
FIG. 2 is a section taken on the line 1—1 in FIG. 1.

The pressure pad illustrated in FIGS. 1 and 2 comprises a rigid base 1 having a raised, integral central portion 2 on which a conventional, planar flexi-circuit 3 is bonded. The flexi-circuit 3 comprises a plastics substrate having a thickness in the order of 0.002 inches (0.005 cm) such as Kapton carrying an array of copper wires shown in more detail in FIG. 3. The flexi-circuit 3 extends beyond the base 1 to a connector 4 which enables each of the common conductors (F1(X)–F16(X), C1(X)–C11(X)) from the flexi-circuit to be connected to the remainder of the pressure sensing system (FIG. 4) incorporating the pressure pad and for detecting signatures.

A second flexi-circuit 5 is mounted above and substantially parallel with the flexi-circuit 3 on a stainless steel diaphragm 6. The flexi-circuit 5 is spaced from the flexi-circuit 3 by a hollow rectangular spacer 7 having a thickness in the order of 0.004 inches (0.01 cm).

The flexi-circuit 5 extends beyond the base 1 to a connector 16, similar to the connector 4 to enable the common conductors (F1(Y)–F16(Y), C1(Y)–C3(Y)) to be connected to the pressure sensing apparatus.

The flexi-circuits 3, 5 are bonded to opposite sides of the spacer 7 to define a sealed space 8.

The mechanical stiffness of the diaphragm 6 must be carefully controlled so that the diaphragm responds to light signing pressure. Conveniently the diaphragm 6 has a thickness of $3.5 \times 10^{-3}$ inches ($8.9 \times 10^{-3}$ cm).

A bore 9 extends through the base 1 from the space 8 into a counterbore 10 of larger diameter which is closed by a flexible diaphragm 11 bonded to a steel annulus 11' having a thickness of 0.02 inches (0.05 cm) and to an underside of the base 1. The diaphragm 11 is made of Kapton and is 0.001 inches (0.003 cm) thick and has a stiffness less than that of the diaphragm 6.

The space 8 and the bores 9, 10 are filled with a liquid of low compressibility and high electrical resistivity such as a silicone fluid of the polydimethylsiloxane type with a viscosity in the five to twenty centistokes region (preferably five centistokes) via ports (not shown).

Figure 3:
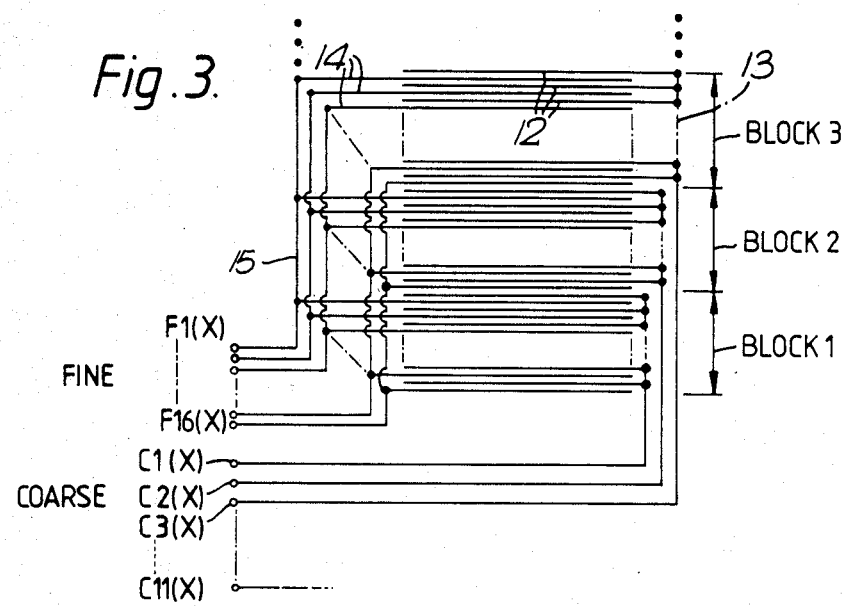
FIG. 3 illustrates one of the arrays (X) of electrical conductors used in the FIG. 1 example.
Figure 4:
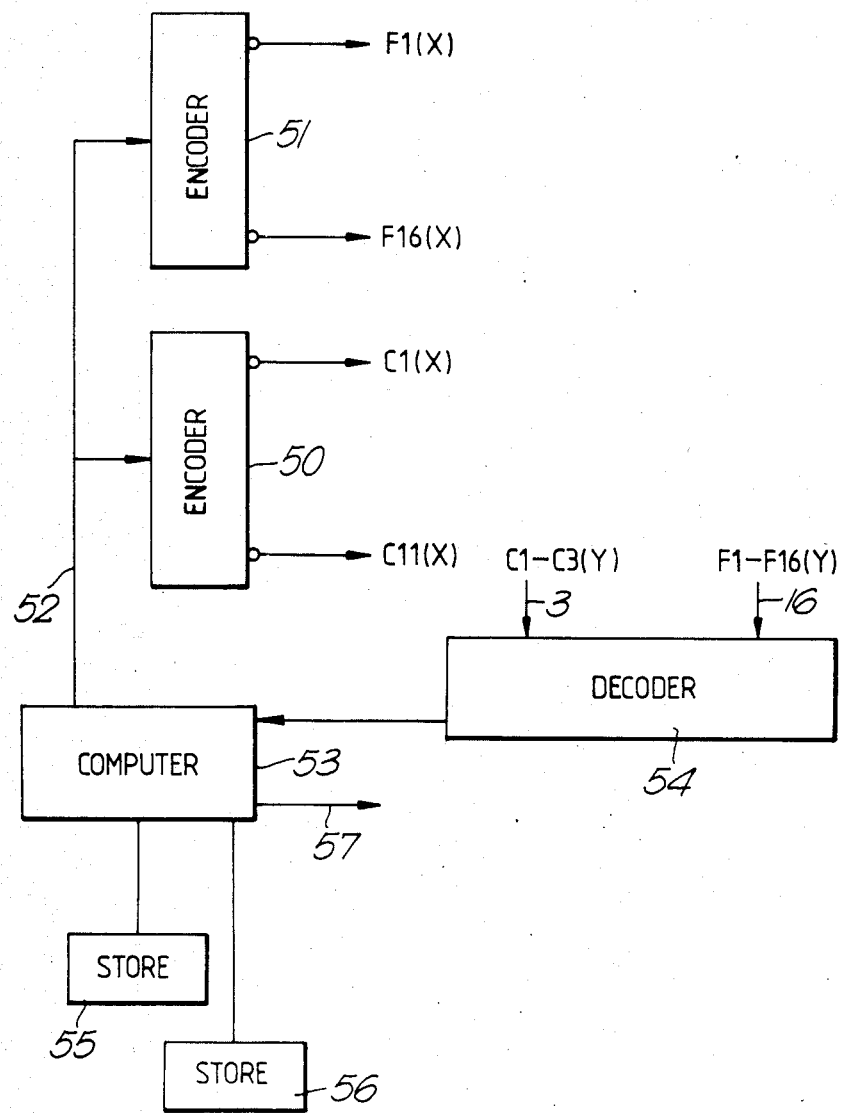
FIG. 4 is a block diagram of the processing circuitry connected to the arrays of the pressure pad of FIG. 1.

The arrangement of electrical conductors on the flexi-circuit 3 is shown in more detail in FIG. 3. Only a portion of the array is shown in the drawing. The array is divided into eleven blocks, three of which are shown in FIG. 3, arranged side by side and extending in the "X" direction (i.e. the direction of signing). Each block contains sixteen parallel first electrical conductors 12 connected to a respective common coarse position conductor 13 of which there is one for each block labelled C1(X)–C11(X). In addition, each block includes another sixteen substantially parallel second conductors 14 which are interleaved between respective pairs of the conductors 12. Corresponding second conductors 14 from each block are connected to respective common fine position conductors 15 of which there are sixteen labelled F1(X)–F16(X). Typically, the conductors 12, 14 are separated by about 0.010 inches (0.03 cm). In other arrangements (not shown), second conductors 14 may be interleaved between only some of the first conductors 12 or there may be more than one second conductor 14 between pairs of the first conductors 12.

The flexi-circuit 5 is similar to the circuit 3 but only has three blocks of first and second conductors 12, 14 connected in a similar manner to common coarse and fine position conductors 13, 15 respectively and extending in a "Y" direction orthogonal to the X direction.

The eleven coarse conductors C1(X) of the flexi-circuit 3 are connected to respective output ports of an "open collector" type encoder system 50 made up from a number of binary decoders type 74156N. The 16 common fine conductors F1(X)–F16(X) are connected to respective output ports of a second "open collector" encoder system 51. The encoder systems 50,51 are coupled via an address bus 52 with a controlling microcomputer 53. The three common coarse conductors C1(Y)–C3(Y) of the flexi-circuit 5 are connected with respective ones of a first set of input ports of a decoder 54 formed for example by a number of 244 type buffer chips while the 16 common fine conductors F1(Y)–F16(Y) are connected to respective ones of a second set of input ports of the decoder 54 formed by a further number of 244 type buffer chips. The output from the decoder 54 representing the address of the input port on which a signal is received is connected to the microcomputer 53. The microcomputer 53 is also connected with two stores such as RAMs 55, 56. Control signals generated by the computer for controlling other parts of the pressure location system are transmitted along a control line 57.

For signature verification the blocks of the circuit 3 will be positioned side by side in the direction of signing while the blocks of the circuit 5 will be positioned side by side in a direction orthogonal to the signing direction but extending fully across the signing area.

The flexi-circuits 3, 5 are mounted so that the sets of conductors 12, 14 in each flexi-circuit are spaced apart by about 0.004 inches (0.01 cm).

In use, a set valve potential (typically about 5 V) is applied to each of the 27 common conductors 13, 15 of the flexi-circuit 3 via the connector 4, and the encoder systems 50,51 under control of the microcomputer 53. When pressure is applied to the flexi-circuit 5, for example while a signature is being written, the flexi-circuit 5 will deflect towards the base 1 causing the liquid in the space 8 to be pushed away from the point of contact. This is accompanied by deflection of the diaphragm 11 in view of the incompressible nature of the liquid. This flow of liquid also forces the flexi-circuit 5 outwards at other points so that only a small area of the flexi-circuit 5 will be brought adjacent to the flexi-circuit 3. At this position, one or a small number of the conductors 12, 14 of one flexi-circuit will be positioned close to or contact a similar small number of conductors 12, 14 of the other flexi-circuit. The micro-computer determines which of the coarse and fine conductors 13, 15 of each flexi-circuit are located at this position so as to determine a matrix of contact points. After the writing instrument is removed, the diaphragm 11 will force liquid back through the bore 9 into the space 8 and the pressure pad will return to its rest position shown in FIG. 2.

To determine which conductors are at the position of applied pressure, the microcomputer 53 strobes the 11 common coarse conductors C1(X)–C11(X) in series followed by each of the 16 common fine conductors F1(X)–F16(X) in series. Thus, a full strobe of the flexi-circuit 3 comprises transmitting 27 signals (or activating) in sequence along the coarse and fine common conductors by modifying the set value potential. The common coarse and fine conductors are strobed under the control of the microcomputer 53 which transmits the addresses of the output ports of the encoder systems 50, 51 in sequence along line 52.

One possible disadvantage of this strobing system is that when the pressure pad is used in a signature verification application, it is possible that the writing instrument may have moved between the time that the coarse conductors are strobed and the next adjacent fine conductor. A typical signing speed is about 200 mm/sec and so the writing instrument can move by about 1.2 mm since all 27 coarse and fine common conductors are typically strobed in about 6 ms. If this occurs, then the microcomputer 53 can compensate for this by recognising a discontinuity. In an alternative strobing system, each of the 16 common fine conductors F1(X)–F16(X) could be strobed after each of the coarse common conductors C1(X)–C11(X).

The 16 common fine conductors F1(Y)–F16(Y) and the three common coarse conductors C1(Y)–C3(Y) of the flexi-circuit 5 are connected to respective input ports of the decoder 54. The microcomputer 53 monitors each of the output ports of the buffer chips of the decoder 54 and will sense at one or more of these output ports connected to the Y array conductors adjacent the position of applied pressure a change in the state of the voltage on the Y array conductors brought adjacent to the conductors of the X array on the flexi-circuit 3 when those X array conductors are strobed. The addresses of the coarse and fine conductors concerned of the Y array (of which there will be at least two, one coarse and one fine) are fed to the microcomputer 53 from the decoder 54.

The microcomputer 53 can thus determine the position of the matrix of contact points by knowing which of the X conductors has been strobed and which of the Y array conductors have sensed a signal. The block of conductors in each array concerned is determined from the information relating to the coarse conductors while the position within the block is determined from the fine conductors. This matrix of contact points is stored in the RAM 55 and then analysed by the microcomputer 53 to determine the centre of the position of applied pressure. This centre position is then stored in the RAM 55.

The signals received at the decoder 54 are repeatedly sampled so that a map can be built up of the movement of the writing instrument. This map is stored in the store 55.

It should be noted in particular that no special writing instrument is required with this system. A conventional pen or pencil can be used.

A map of a genuine signature is stored in the store 56 and the microcomputer 53 then compares using conventional techniques the signature stored in the store 55 with the genuine signature. If the signature is verified then an appropriate control signal is transmitted along the control line 57 to a display (not shown) and/or to control apparatus connected to the signature verification apparatus. Such apparatus may include a cash dispenser or the like which is controlled to dispense cash to a verified user.

Figure 7:
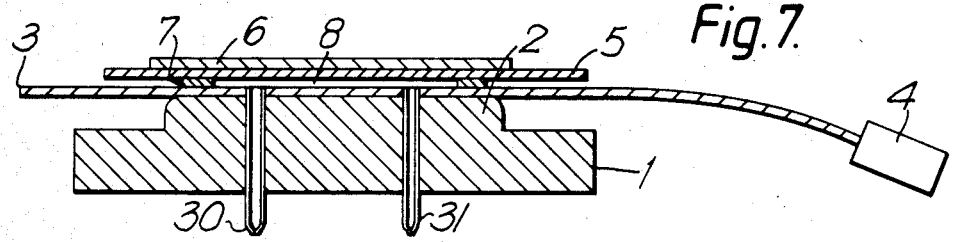
FIG. 7 is a view similar to FIG. 2 of a modification of the FIG. 1 example.

FIG. 7 illustrates a modified (and currently preferred) form of the pad shown in FIGS. 1 and 2. The same reference numerals are used to indicate similar parts. In this modification the diaphragm 11 is removed. Instead the diaphragm 6 is chosen to have a thickness of 0.0035 inches (0.09 mm) and the space 8 is filled with silicone fluid having a viscosity of 5 centistokes and with the exclusion of residual air. This combination of flexible diaphragm and low viscosity fluid enables a high sensitive response to fast signing rates to be achieved.

In this modification, fluid is injected into the space 8 with a hypodermic needle extending through a capillary filling tube 30. A vent capillary tube 31 is provided. After filling the filling and vent tubes 30, 31 are sealed.

Figure 5:
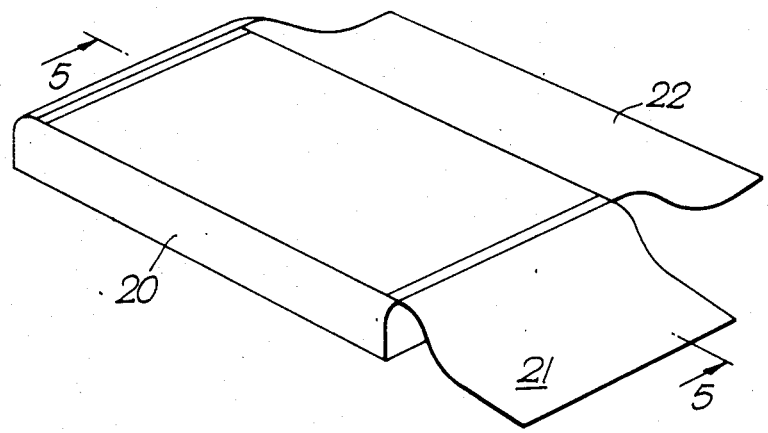
FIG. 5 is a perspective view of a second example of a pressure pad.
Figure 6:
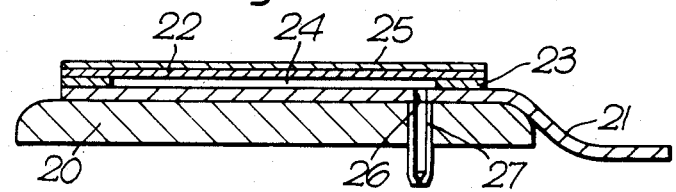
FIG. 6 is a section taken on the line 5—5 in FIG. 5.

Another example of a pressure pad is shown in FIGS. 5 and 6. This comprises a rigid base 20 to which a flexi-circuit 21 is bonded similar to the flexi-circuit 3. A second flexi-circuit 22 similar to the flexi-circuit 5 is bonded to a separator 23 to define a sealed space 24 between the two flexi-circuits. The flexi-circuits are spaced apart by a distance in the order of 0.04 inches (0.1 mm). A layer of wear resistant material 25 (for example reinforced neoprene rubber of thickness 0.015 inches (0.04 cm) or stainless steel thickness 0.0035 inches (0.09 mm) is applied to the outer surface of the flexi-circuit 22 to help prevent impact damage to the circuit 22.

Two small apertures one of which 26 is shown are provided in the flexi-circuit 21. The apertures are in communication with a brass capillary filling tube 27 and a vent tube (not shown) respectively which are crimped and soldered when the pad has been filled with silicone fluid.

As can be seen in FIG. 5, the flexi-circuits 21, 22 extend beyond the base 20 for connection with connectors (not shown) similar to the connectors 4, 16 of the previous example.

The space 24 is partly filled with a liquid (for example silicone fluid with viscosity of 5 centistokes which separates the flexi-circuits 21, 22. The volume of liquid can be adjusted to modify the force required to bring the two circuits into contact by the application of a point load to the top circuit 22. Further, residual air is trapped in the space 24 to ensure that loads applied to the seals when the pad is in use are within safe limits for the sealing method used. The sealing methods may include mechanical clamping, adhesives, ultrasonic welding and the like.

Operation of the pad is substantially the same as in the previous example except that instead of the diaphragm 11 distorting to allow movement of the liquid, this is accommodated by the inclusion of residual air.

We claim:

1. A pressure pad comprising first and second arrays of substantially parallel electrical conductors which are superposed and biased towards a spaced apart position with the conductors of said first array transverse to the conductors of said second array, wherein at least one of said arrays is responsive to applied pressure on said array to deflect against said bias towards the other array, wherein at least said first array comprises a number of blocks of substantially parallel first conductors, a number of first and second common conductors, said first conductors of each block being electrically connected to respective first common conductors and, between pairs of said first conductors of each block, a respective second conductor, corresponding second conductors from each block being electrically connected to a respective second common conductor, and wherein said conductors of said arrays are adapted to be connected to processing means to enable the position of applied pressure to be determined.

2. A pad according to claim 1, wherein said conductors are spaced apart by substantially equal intervals.

3. A pad according to claim 1, wherein each array comprises a number of blocks of substantially parallel first conductors; a number of first and second common conductors; said first conductors of each block being electrically connected to respective first common conductors; and, between pairs of said first conductors of each block, a respective second conductor, corresponding second conductors from each block being electrically connected to a respective second common conductor, one of said arrays comprising three said blocks of substantially parallel conductors and the other array comprising eleven said blocks of substantially parallel conductors.

4. A pad according to claim 1, wherein said arrays define a space therebetween which is sealed and contains a substantially incompressible fluid, whereby when pressure is applied to said one array, said fluid flows away from the position of applied pressure.

5. A pad according to claim 4, wherein said fluid comprises one of a liquid and a pressurised gas at a pressure greater than 1 atmosphere.

6. A pad according to claim 5, wherein said fluid comprises a liquid, said liquid including residual air to assist liquid flow to take place when pressure is applied to said one array.

7. A pad according to claim 4, wherein part of a wall defining said sealed space is flexible with said space being substantially filled with fluid when said wall part is in a non-flexed condition.

8. A pad according to claim 7, wherein an additional chamber is provided in fluid communication with said sealed space, said flexible wall part defining part of said additional chamber.

9. A pressure location system including a pressure pad comprising first and second arrays of substantially parallel electrical conductors which are superposed and biased towards a spaced apart position with the conductors of said first array transverse to the conductors of said second array, wherein at least one of said arrays is responsive to applied pressure on said array to deflect against said bias towards the other array, wherein at least said first array comprises a number of blocks of substantially parallel first conductors; a number of first and second common conductors; said first conductors of each block being electrically connected to respective first common conductors; and, between pairs of said first conductors of each block, a respective second conductor, corresponding second conductors from each block being electrically connected to a respective second common conductor, and wherein said conductors of said arrays are adapted to be connected to processing means to enable the position of applied pressure to be determined and processing means electrically connected to said conductors of each array, said processing means being adapted to transmit signals along said conductors of said second array and to determine from signals received on said first common conductors of said first array the location of a block of conductors of said first array within which a position of applied pressure is located and to determine from signals received on said second common conductors of said first array the position of applied pressure within said block.

10. A system according to claim 9, wherein said processing means is adapted to transmit signals along said conductors of said second array in sequence.

11. A system according to claim 10, wherein each array comprises a number of blocks of substantially parallel first conductors; a number of first and second common conductors; said first conductors of each block being electrically connected to respective first common conductors; and, between pairs of said first conductors of each block, a respective second conductor, corresponding second conductors from each block being electrically connected to a respective second common conductor, said processing means being adapted to strobe each of said first common conductors of said second array in sequence and then each of said second common conductors of said second array in sequence.

12. A system according to claim 11, said processing means comprising encoding means having a plurality of output ports each of which is connected to a respective one of said first and second common conductors of said second array; and control means connected to said encoding means for generating the address of each output port of said encoding means in sequence whereby a signal is transmitted from each output port when it is addressed.

13. Signature determination apparatus comprising a pressure location system according to claim 10; and a storage system coupled with said processing means to record the series of positions of applied pressure determined by said processing means while a signature is written on said pressure pad to generate a record of the signature.

* * * * *